Aug. 1, 1939.  Z. A. DYER  2,167,747
TOP CEMENTING PLUG
Filed Oct. 12, 1938
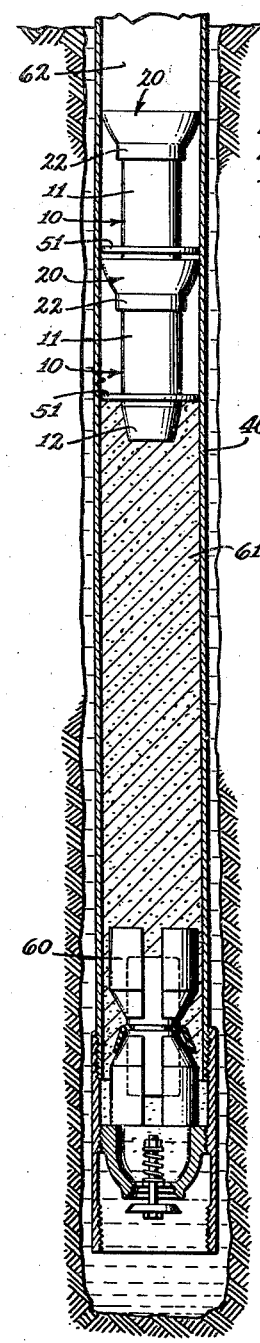
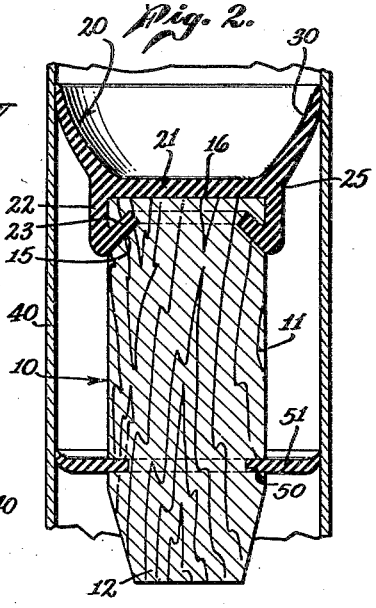
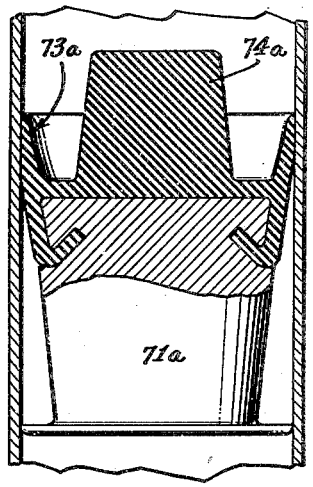
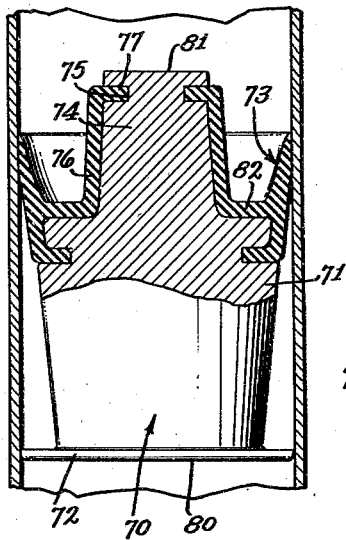
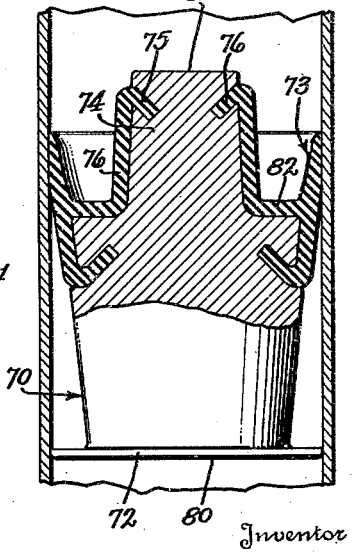
Inventor
ZEB A. DYER,
By Herbert A. Huebner
Attorney Patented Aug. 1, 1939

2,167,747

UNITED STATES PATENT OFFICE 2,167,747

TOP-CEMENTING PLUG

Zeb A. Dyer, Los Angeles, Calif., assignor of one-fourth to Charles Lamb and one-fourth to Douglas R. Radford, both of South Pasadena, Calif.

Application October 12, 1938, Serial No. 234,626

9 Claims. (Cl. 166—1)

This invention is an improvement in top cementing plugs for use in the cementing off operations in oil wells and other deep wells.

In such operations a charge of liquid cement is conducted to the lower end of the well hole and forced into the area surrounding the lower end of the casing. It is desirable to isolate the cement from mud and water, and is customary to employ a lower cementing plug and an upper cementing plug with a charge of liquid cement between, forcing the assembled mass down through the well casing by rotary mud under pressure. At the bottom of the hole, continued pressure serves to eject the cement into the area surrounding the casing. When the cement has hardened, the plugs are drilled out to clear the casing.

The present application is a continuation in part of my co-pending application filed August 2, 1938, Serial Number 222,626. In that application I illustrated a top plug comprising a body having an annular groove about its upper end, a rubber cup and packing flange contracted on the upper end of the body, and an annular washer near the lower end of the body.

My present invention utilizes the same basic structure, which will be described in more detail, and incorporates certain improvements, as well as illustrating certain modified forms of plug comprising the invention.

In the drawing:

Figure 1 illustrates the lower portion of a well hole and casing, with my novel plug shown in its relation to a charge of cement.

Figure 2 is a vertical cross section of my top cementing plug in detail.

Figure 3 is a sectional view of a modified form of plug.

Figure 4 is a view of a plug similar to that of Figure 3 with a modified means of attaching my rubber cup and packing flange.

Figure 5 is a view of a plug similar to that of Figure 3 in which the upper end of the plug body and the rubber cup and packing flange are formed of one piece.

Referring to Figure 2, the plug 10 comprises a cylindrical body member 11 formed of any suitable material such as wood, rubber or other composition, or metal. Wood is generally satisfactory, and usually the cheapest. The lower end of the body member is tapered as shown at 12, although this is not essential.

Near the upper end of the body member an annular groove or recess 15 is formed therein for a purpose hereinafter described. This recess is inclined upwardly toward the axis of the body member. While this inclination of the recess has certain advantages hereinafter described, the invention may be embodied in the same or equivalent forms of plug with the annular recess lying in a plane at right angles to the axis of the body member as shown in Figure 3.

Seating on the top 16 of the body member 11 is a rubber cup and packing flange 20. The cup comprises a bottom wall 21 which fits against and covers the top 16 of the body member. It is formed with a downwardly extending annular collar 22 adapted to stretch over and snugly fit the upper end of the body member, and the collar has a flange 23 extending inwardly, and, if the recess is inclined upwardly, upwardly into the recess 15. The bottom wall, annular collar and flange are made smaller than the complementary parts which they engage, and the cup is installed by stretching it over the upper end of the body member and permitting the wall, collar and flange to axially contract upon the body member, tightly gripping same.

The cup has a shoulder 25 joining the bottom wall 21 with the collar 22.

Extending from this shoulder and integral with the cup is a packing flange 30. The packing flange flares upwardly and outwardly, the upper portion thereof having a normal diameter greater than the inside diameter of casing 40, so that when inserted in the casing the packing flange radially expands against it.

Near the lower end of the body member an annular groove 50 is formed to receive a rubber washer 51 which is stretched over the body and snapped into place. The washer 51 has an outside diameter greater than the inside diameter of the casing and forms a snug fit therein.

In the use of the invention a lower cementing plug 60 of any suitable form is inserted into the well casing, followed by a charge of liquid cement 61 and one or more of my top cementing plugs 10.

Under some conditions it is desirable to use two or more plugs in tandem, as illustrated in Figure 1, the bottom of one plug resting in the cup of the plug below.

The assembly of plugs and cement is forced downwardly through the casing by rotary mud 62 under pressure acting upon plug 10.

In this operation washer 51 functions as a piston ring, pushing cement ahead of it and also protecting the cement below it from any mud which may escape past the packing flange 30.

Rotary mud fills the cup 20 and exerts pressure upon its bottom wall 21, shoulder 25 and packing flange 30. The pressure is downward upon the bottom wall 21, and radially downward upon shoulder 25 and packing flange 30. The greater the pressure the tighter the packing flange is expanded against the wall of the casing, sealing off the mud above while the plug is being driven downwardly by the mud.

As mud pressure radially expands the packing flange 30 there will be a torsion on shoulder 25 tending to twist it outwardly and downwardly, which might under some circumstances result in the cup being dislodged from the body member. To reduce this possibility, the flange 23 may be inclined upwardly and inwardly, as previously described, so that such a torsional rotation of the shoulder 25 is communicated through collar 22 to flange 23 and results in pushing the flange more tightly into the recess 15.

The modified forms of plug 70 shown in Figures 3, 4, and 5 are all substantially the same in external configuration.

Each comprises a body member 71 of frusto-conical design having a rubber or leather washer 72 at the lower end, and a rubber cup and packing flange 73 on the upper portion. The cup and packing flange generally follows as an upward and outward flaring extension of the frusto-conical part of the body member.

The body member is formed with a central upward extension 74 rising above the upper edge of the packing flange, and having an annular recess 75. The bottom wall 82 of the cup 73 is turned upwardly as at 76 being snugly stretched over the extension 74 and provided with a flange 77 which axially contracts in recess 75 and aids in retaining the cup in place.

The extension 74 is necessary in this form of plug to provide a separation between washer 72 and the cup and packing flange 73 when two or more plugs are used in tandem. The lower end 80 of one plug rests on the upper end 81 of the plug below.

In Figure 3 the axially contracting flanges of the cup extend horizontally into the body member, while in Figure 4 they enter at an angle to assure a tighter grip under stress.

In Figure 5 the body member 71a has an upper portion similar to that in Figure 3, and the extension 74a is formed integral with the cup and packing flange 73a. The cup and packing-flange is necessarily elastic, but the extension 74a may be of a hard rubber or other relatively cheap composition to which the cup and packing flange is vulcanized.

What I claim is:

1. In a cementing plug for use in cementing casings in deep wells, the combination of: a body having an annular groove near its upper end, a rubber cup formed with a bottom wall and a collar enclosing the upper end of the body, and an axially contracting flange gripping the body in the recess, and a packing flange extending upwardly and outwardly from the bottom wall of the cup adapted to form a packing between the body and the well casing in which the plug is inserted.

2. In a cementing plug for use in cementing casings in deep wells, the combination of: a body having an annular groove near its upper end, a rubber cup formed with a bottom wall and a collar enclosing the upper end of the body, and an axially contracting flange gripping the body in the recess, a packing flange extending upwardly and outwardly from the bottom wall of the cup adapted to form a packing between the body and the well casing in which the plug is inserted, and means on the lower portion of the body adapted to engage the casing and cooperating with the cup to maintain the body concentrically disposed relative to the casing.

3. In a cementing plug for use in cementing casings in deep wells, the combination of: a body having an annular groove near its upper end inclined upwardly toward the axis thereof, a rubber cup formed with a bottom wall and a collar enclosing the upper end of the body, and an axially contracting flange gripping the body in the recess, a packing flange extending upwardly and outwardly from the bottom wall of the cup adapted to form a packing between the body and the well casing in which the plug is inserted, and means on the lower portion of the body adapted to engage the casing and cooperating with the cup to maintain the body concentrically disposed relative to the casing.

4. A cementing plug for use in cementing casings in wells comprising: a guide body having an annular recess near its upper end, a resilient cup on the upper end of the body having a flange adapted to expand radially under pressure, the cup having a gripping element axially contracting in the annular recess to aid in retaining the cup on the body.

5. A cementing plug for use in cementing casings in wells comprising: a guide body having an annular recess near its upper end, a resilient cup on the upper end of the body having a flange adapted to expand radially under pressure, the cup having a gripping element axially contracting in the annular recess to aid in retaining the cup on the body, the annular recess and the gripping element entering the guide body at an angle inclined upwardly toward the axis thereof whereby pressure on the flange will tend to wedge the gripping element more tightly into the recess.

6. In a cementing plug for use in cementing casings in deep wells, the combination of: a body having an annular recess near its upper end and an annular groove near its lower end, a rubber cup formed with a bottom wall and a collar enclosing the upper end of the body, and an axially contracting flange gripping the body in the recess, a packing flange extending upwardly and outwardly from the bottom wall of the cup adapted to form a packing between the body and the well casing in which the plug is inserted, and means on the lower portion of the body adapted to engage the casing and cooperating with the cup to maintain the body concentrically disposed relative to the casing, said means comprising a rubber washer axially contracted in the recess near the lower end of the body.

7. In a cementing plug for use in cementing casings in deep wells, the combination of: a body having an annular groove about its upper end; a rubber cup including a bottom wall which fits against and covers the upper end of said body; an annular packing flange which extends upwardly and outwardly from said bottom wall; an annular attaching flange which is formed integral with said cup adjacent the juncture of said bottom wall and said packing flange, said attaching flange extending downwardly and inwardly into said annular groove to rigidly hold said cup on said body; and means on the lower end of said body for engaging the casing in which said plug is inserted and cooperating with said cup to maintain said body concentrically disposed relative to said casing.

8. In a cementing plug for use in cementing casings in deep wells, the combination of: a body having an annular groove about its upper end; a rubber cup including a bottom wall which fits against and covers the upper end of said body, an annular packing flange which extends upwardly and outwardly from said bottom wall; an annular attaching flange which is formed integral with said cup adjacent the juncture of said bottom wall and said packing flange, said attaching flange extending downwardly and inwardly into said annular groove to rigidly hold said cup on said body; means provided on a lower portion of said body for guiding said lower portion centrally in a casing in which said plug is operating; and a boss provided on said body to extend downwardly below said guide means a sufficient distance that when a pair of said plugs are inserted in said casing in a tandem relation said boss extends into said cup and spaces said guide means of one plug from the packing flange of the adjacent plug thereby permitting the packing flange of both plugs to function properly during a cementing operation.

9. In a cementing plug for use in cementing casings in deep wells, the combination of: a body having an annular groove about its upper end; a rubber cup including a bottom wall which fits against and covers the upper end of said body, an annular packing flange which extends upwardly and outwardly from said bottom wall; an annular attaching flange which is formed integral with said cup adjacent the juncture of said bottom wall and said packing flange, said attaching flange extending downwardly and inwardly into said annular groove to rigidly hold said cup on said body, a second annular groove being formed around said body in a lower portion of said body; an annular washer mounted in said second groove and extending outwardly a sufficient distance to centralize said lower portion in a casing in which a plug is operating; and a boss formed on the lower end of said body below said washer and extending downwardly therebelow a sufficient distance so that when a plurality of said plugs are inserted tandem-fashion in a casing in a cementing operation, said boss of each plug except the lowermost extends into the cup of the plug immediately therebelow a sufficient distance to space said cup downwardly from the guide washer immediately thereabove and thereby maintaining the packing flanges of all of said plugs free to perform their functions throughout said cementing operation.

ZEB A. DYER.